United States Patent [19]
Venis

[11] Patent Number: 6,126,189
[45] Date of Patent: Oct. 3, 2000

[54] TRAILER HITCH APPARATUS

[76] Inventor: Lonnie A. Venis, 284 17th Ave., Longview, Wash. 98632

[21] Appl. No.: 09/258,333
[22] Filed: Feb. 25, 1999
[51] Int. Cl.⁷ ....................................................... B60D 1/06
[52] U.S. Cl. ...................... 280/511; 280/490.1; 280/461.1
[58] Field of Search ................................. 280/511, 460.1, 280/462, 490.1, 461.1

[56] References Cited

U.S. PATENT DOCUMENTS

| | | | |
|---|---|---|---|
| 4,113,272 | 9/1978 | Sebby | 280/402 |
| 4,248,451 | 2/1981 | Usinger | 280/490.1 |
| 4,613,149 | 9/1986 | Williams | 280/508 |
| 4,679,812 | 7/1987 | Byrnes | 280/406.2 |
| 5,290,056 | 3/1994 | Fath, IV | 280/477 |

Primary Examiner—Kevin Hurley
Assistant Examiner—Andrew J. Fischer

[57] ABSTRACT

A new trailer hitch apparatus for hitching a trailer to a vehicle so that the trailer is in a level state when hitched. The inventive device includes a vertical member coupled to a horizontal member. A securing arm member and a hitching cap member are coupled to the horizontal member. A U-shaped securing bolt is coupled to the securing arm member for permitting the attachment of the hitching shaft of a trailer to the securing arm member. Coupled to the vertical member is a mounting member with a trailer mounting portion designed for mounting a hitch ball thereto.

13 Claims, 2 Drawing Sheets

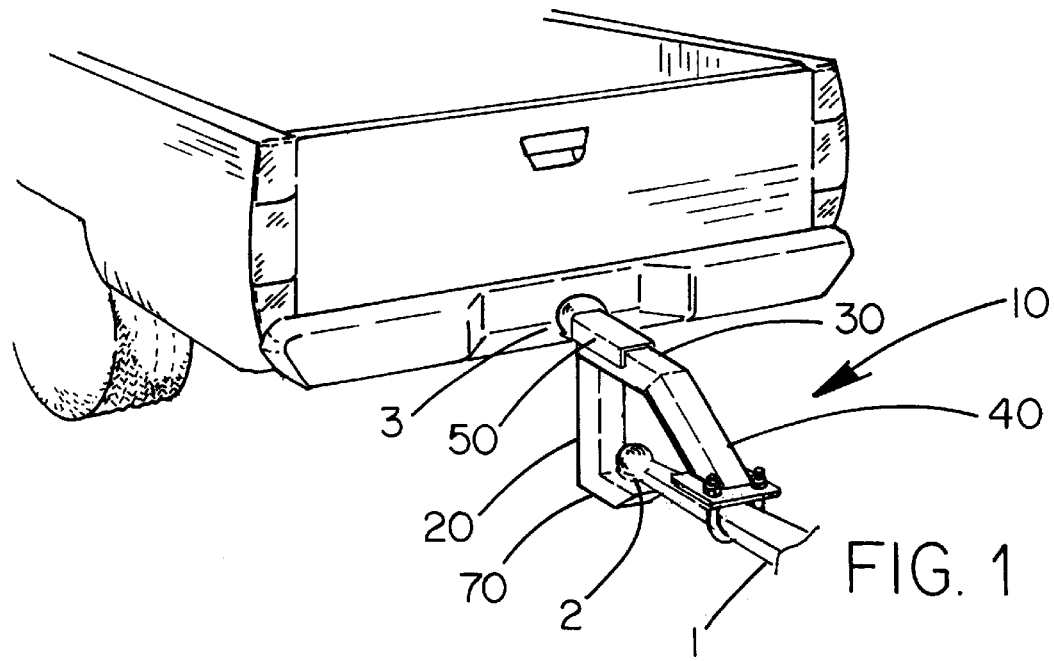
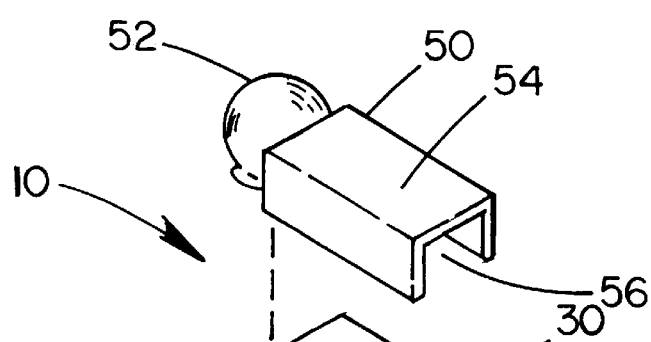
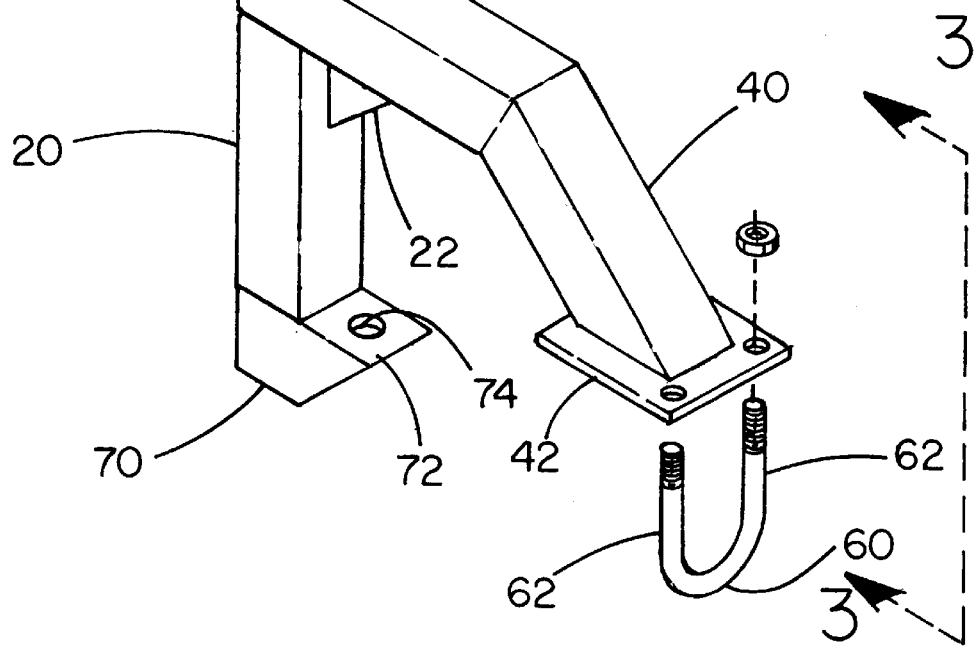

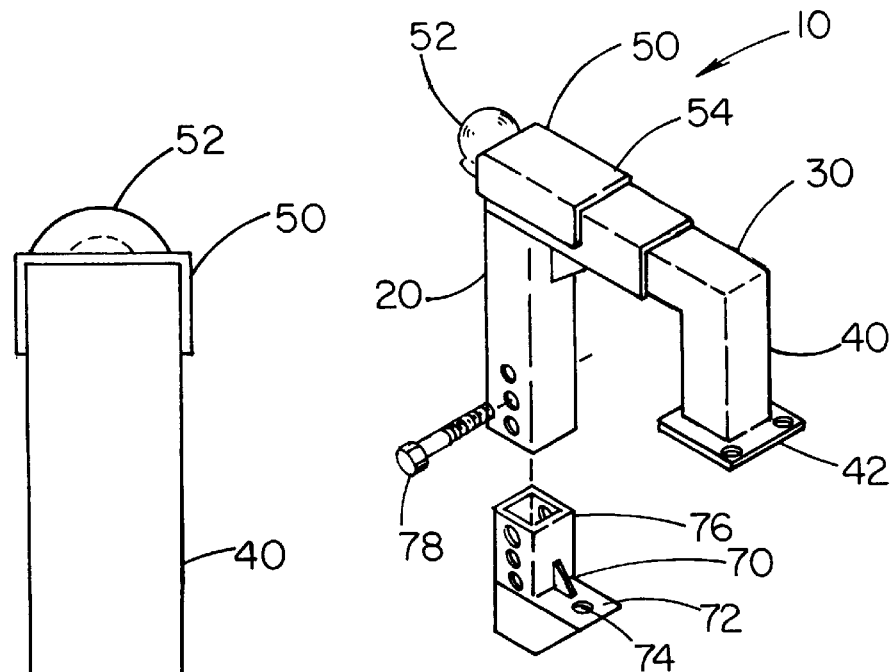
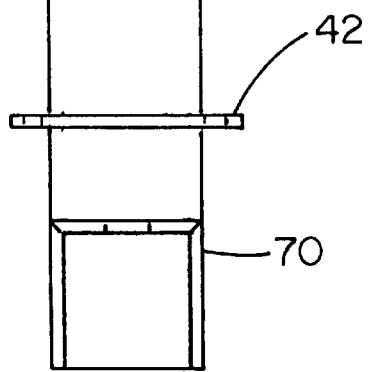
FIG. 3
FIG. 5
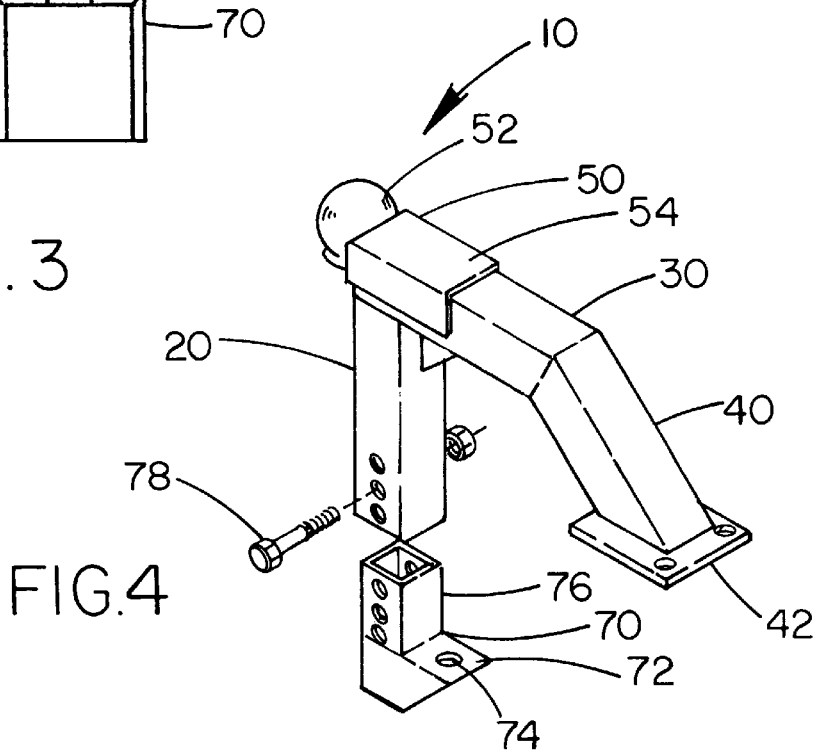
FIG. 4

TRAILER HITCH APPARATUS

BACKGROUND OF THE INVENTION

1. Field of the Invention

The present invention relates to trailer hitch apparatuses and more particularly pertains to a new trailer hitch apparatus for hitching a trailer to a vehicle so that the trailer is in a level state when hitched.

2. Description of the Prior Art

The use of trailer hitch apparatuses is known in the prior art. More specifically, trailer hitch apparatuses heretofore devised and utilized are known to consist basically of familiar, expected and obvious structural configurations, notwithstanding the myriad of designs encompassed by the crowded prior art which have been developed for the fulfillment of countless objectives and requirements.

Known prior art trailer hitch apparatuses include U.S. Pat. No. 4,759,564; U.S. Pat. No. 4,606,549; U.S. Pat. No. Des. 317,426; U.S. Pat. No. 4,792,151; U.S. Pat. No. 4,157,189; and U.S. Pat. No. 4,213,627.

While these devices fulfill their respective, particular objectives and requirements, the aforementioned patents do not disclose a new trailer hitch apparatus. The inventive device includes a vertical member coupled to a horizontal member. A securing arm member and a hitching cap member are coupled to the horizontal member. A U-shaped securing bolt is coupled to the securing arm member for permitting the attachment of the hitching shaft of a trailer to the securing arm member. Coupled to the vertical member is a mounting member with a trailer mounting portion designed for mounting a hitch ball thereto.

In these respects, the trailer hitch apparatus according to the present invention substantially departs from the conventional concepts and designs of the prior art, and in so doing provides an apparatus primarily developed for the purpose of hitching a trailer to a vehicle so that the trailer is in a level state when hitched.

SUMMARY OF THE INVENTION

In view of the foregoing disadvantages inherent in the known types of trailer hitch apparatuses now present in the prior art, the present invention provides a new trailer hitch apparatus construction wherein the same can be utilized for hitching a trailer to a vehicle so that the trailer is in a level state when hitched.

The general purpose of the present invention, which will be described subsequently in greater detail, is to provide a new trailer hitch apparatus and method which has many of the advantages of the trailer hitch apparatuses mentioned heretofore and many novel features that result in a new trailer hitch apparatus which is not anticipated, rendered obvious, suggested, or even implied by any of the prior art trailer hitch apparatuses, either alone or in any combination thereof.

To attain this, the present invention generally comprises a vertical member coupled to a horizontal member. A securing arm member and a hitching cap member are coupled to the horizontal member. A U-shaped securing bolt is coupled to the securing arm member for permitting the attachment of the hitching shaft of a trailer to the securing arm member. Coupled to the vertical member is a mounting member with a trailer mounting portion designed for mounting a hitch ball thereto.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new trailer hitch apparatus and method which has many of the advantages of the trailer hitch apparatuses mentioned heretofore and many novel features that result in a new trailer hitch apparatus which is not anticipated, rendered obvious, suggested, or even implied by any of the prior art trailer hitch apparatuses, either alone or in any combination thereof.

It is another object of the present invention to provide a new trailer hitch apparatus which may be easily and efficiently manufactured and marketed.

It is a further object of the present invention to provide a new trailer hitch apparatus which is of a durable and reliable construction.

An even further object of the present invention is to provide a new trailer hitch apparatus which is susceptible of a low cost of manufacture with regard to both materials and labor, and which accordingly is then susceptible of low prices of sale to the consuming public, thereby making such trailer hitch apparatus economically available to the buying public.

Still yet another object of the present invention is to provide a new trailer hitch apparatus which provides in the apparatuses and methods of the prior art some of the advantages thereof, while simultaneously overcoming some of the disadvantages normally associated therewith.

Still another object of the present invention is to provide a new trailer hitch apparatus for hitching a trailer to a vehicle so that the trailer is in a level state when hitched.

Yet another object of the present invention is to provide a new trailer hitch apparatus which includes a vertical member coupled to a horizontal member. A securing arm member and a hitching cap member are coupled to the horizontal member. A U-shaped securing bolt is coupled to the securing arm member for permitting the attachment of the hitching shaft of a trailer to the securing arm member. Coupled to the vertical member is a mounting member with a trailer mounting portion designed for mounting a hitch ball thereto.

Still yet another object of the present invention is to provide a new trailer hitch apparatus that is adjustable to permit the level positioning of various size and height trailers to the hitches of various size and height vehicle.

Even still another object of the present invention is to provide a new trailer hitch apparatus that includes a gusset member for providing additional strength to the coupling of the vertical member to the horizontal member of the invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic illustrative perspective view of a new trailer hitch apparatus mounting a hitching shaft of a trailer to the hitch of a vehicle according to the present invention.

FIG. 2 is a schematic partial exploded perspective view of the present invention.

FIG. 3 is a schematic side view of the present invention taken from the vantage of line 3—3 on FIG. 2.

FIG. 4 is a schematic perspective view of the optional ideal embodiment of the present invention having a mounting member slidably and adjustably mounted to the vertical member.

FIG. 5 is a schematic perspective view of another optional ideal embodiment of the present invention having a mounting member slidably and adjustably mounted to the vertical member and the securing arm member extending substantially perpendicular to the horizontal member.

DESCRIPTION OF THE PREFERRED EMBODIMENT

With reference now to the drawings, and in particular to FIGS. 1 through 5 thereof, a new trailer hitch apparatus embodying the principles and concepts of the present invention and generally designated by the reference numeral 10 will be described.

As best illustrated in FIGS. 1 through 5, the trailer hitch apparatus 10 is designed for use in attaching the hitching shaft 1 and socket 2 of a trailer to the hitch 3 of a vehicle. The trailer hitch apparatus 10 generally comprises a vertical member 20 coupled to a horizontal member 30. A securing arm member 40 and a hitching cap member 50 are coupled to the horizontal member 30. A U-shaped securing bolt 60 is coupled to the securing arm member 40 for permitting the attachment of the hitching shaft 1 of a trailer to the securing arm member 40. Coupled to the vertical member is a mounting member 70 with a trailer mounting portion 72 designed for mounting a hitch ball thereto.

Preferably, the vertical member 20, the horizontal member 30, and the securing arm member 40 are all elongated. The horizontal member 30 is coupled to the vertical member 20 so that one end of the horizontal member 30 is positioned towards one end of the vertical member 20. As shown in FIG. 2, it is preferred that the horizontal member 30 is aligned substantially perpendicularly to the vertical member 20.

The other end of the horizontal member 30 is coupled to an end of the securing arm member 40. Preferably, the securing arm member 40 is extended downwards from the horizontal member 30 and away from the vertical member 20. At the unattached end of the securing arm member 40 is a rectangular mounting flange 42. The arms 62 of the U-shaped securing bolt member 60 are preferably detachably coupled to the mounting flange 42 of the securing arm member 40. The arms 62 of the securing bolt member 60 are spaced apart from one another so that a space 64 is defined between the mounting flange 42 and the securing bolt member 60. As illustrated in FIG. 2, this space 64 is designed for extending the hitching shaft 1 of a trailer through it so that the securing bolt member 60 may attach the hitching shaft 1 of a trailer to the securing arm member 40.

With reference to FIG. 2, the hitching cap member 50 has a socket portion 52 and a mounting portion 54 which is coupled to the horizontal member. Preferably, the horizontal member 30 is disposed in a mounting channel 56 in the mounting portion when the horizontal member 30 is coupled to the hitching cap member 50. The hitching cap member 50 is coupled to the horizontal member 30 so that the hitching cap member 50 is positioned towards the end of the horizontal member 30 closest to the vertical member 20. As illustrated in FIG. 1, the socket portion 52 of the hitching cap member 50 extends outwardly from the end of the horizontal member 30 so that the socket portion 52 may mounted to the ball hitch 3 of a vehicle.

The mounting member 70 is couple to the end of the vertical end of the vertical member 20 furthest away from the horizontal member 30. Preferably the trailer mounting portion 72 of the mounting member 70 includes an hitch hole 74 for permitting insertion through it of a hitch ball (not shown) to provide the means for mounting a hitch ball to the mounting member trailer mounting portion 72.

In an optional ideal embodiment of the trailer hitch apparatus 10, the mounting member 70 also has an adjustment portion 76 which slidably mounts the mounting member 70 to one end of the vertical member 20. In this ideal embodiment, the adjustment portion 76 of the mounting member 70 is preferably slidable in relation to the vertical member 20 along a line parallel to the length of the vertical member 20. This arrangement permits adjustment of the distance between the trailer mounting portion 72 and the socket portion 52 of the hitching cap member 50 so that the trailer hitch apparatus 10 may be adjusted to help keep a trailer mounted to invention level when the trailer hitch apparatus 10 is mounted to a vehicle hitch 3. In this ideal optional embodiment, ideally hold means 78 is included for selectively holding the mounting member adjustment portion 76 in a position relative to the vertical member 20.

Ideally, the trailer hitch apparatus 10 also includes a triangular gusset member 22 for providing additional strength to the coupling of the vertical member 20 to the horizontal member 30. The gusset member 22 provides additional strength between the vertical and horizontal members 20, 30 by having one side of the gusset member 22 coupled to the horizontal member 30 and another side of the gusset member 22 coupled to the vertical member 20.

In use, the socket portion 52 of the hitching cap member 50 is first mounted on to the hitch 3 of a vehicle. A ball-type hitch (not shown) is also inserted into the hitch hole 74 in the mounting member trailer mounting portion 72 to mount the ball hitch to the mounting member 70. The hitching shaft of a trailer 1 is then inserted through the securing bolt member 60 which is then coupled to the mounting flange 42 of the securing arm member 40. The socket of the trailer 2 is then mounting on to the ball hitch mounted to the mounting member 70 to secure the trailer to the invention 10. The adjustment portion 76 is finally slid on the vertical member 20 until it is positioned at a position where the attached trailer is in a level position. The hold means 78 then is used to hold the adjustment portion 76 in the final position.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A trailer hitch apparatus for attaching the hitching shaft of a trailer to the hitch of a vehicle, the hitching shaft of the trailer having a socket, said trailer hitch apparatus comprising:

a vertical member;

a horizontal member being coupled to said vertical member;

a securing arm member being coupled to said horizontal member;

a hitching cap member having a hitching cap member socket portion, said hitching cap member being coupled to said horizontal member, said hitching cap member socket portion being for mounting to the ball hitch of a vehicle;

a mounting member having a trailer mounting portion, said mounting member trailer mounting portion being for mounting a hitch ball thereto for hitching the socket of the hitching shaft of a trailer thereto, said mounting member being coupled to said vertical member; and a U-shaped securing bolt member having first and second securing bolt member arms, said first and second securing bolt member arms being coupled to said securing arm member, said first and second securing bolt member arms being spaced apart from one another to define a space between said securing arm member and said securing bolt member, said space being for extending the hitching shaft of a trailer therethrough, said securing bolt member being for attaching the hitching shaft of a trailer to said securing arm member.

2. The trailer hitch apparatus of claim 1, wherein said vertical member has opposite first and second ends, wherein said horizontal member has opposite first and second ends, said horizontal member first end being positioned towards said vertical member first end, wherein said securing arm member has opposite first and second ends, said securing arm member first end being coupled to said horizontal member second end, wherein said hitching cap member is positioned towards said horizontal member first end, wherein said mounting member is coupled to said vertical member second end, and wherein said first and second securing bolt member arms are coupled to said securing arm member second end.

3. The trailer hitch apparatus of claim 2, wherein said vertical member is elongated, wherein said horizontal member is elongated, and wherein said securing arm member is elongated.

4. The trailer hitch apparatus of claim 2, wherein said securing arm member is extended downwards from said horizontal member and being extended away from said vertical member.

5. The trailer hitch apparatus of claim 2, wherein said securing arm member second end has a mounting flange, and wherein said first and second securing bolt member arms are coupled to said mounting flange of said securing arm member second end, wherein said space is between said mounting flange of said securing arm member second end and said securing bolt member.

6. The trailer hitch apparatus of claim 5, wherein said first and second securing bolt member arms are detachably coupled to said mounting flange of said securing arm member second end.

7. The trailer hitch apparatus of claim 2, wherein said hitching cap member has a hitching cap member mounting portion, said hitching cap member mounting portion having a mounting channel, said horizontal member being disposed within said mounting channel, said hitching cap member mounting portion being coupled to said horizontal member, said hitching cap member mounting portion being positioned towards said horizontal member first end.

8. The trailer hitch apparatus of claim 3, wherein said mounting member has an adjustment portion, said mounting member adjustment portion being slidably mounted to said vertical member second end.

9. The trailer hitch apparatus of claim 8, wherein said mounting member adjustment portion is slidable along a line parallel to the length of said vertical member.

10. The trailer hitch apparatus of claim 8, further comprising hold means for selectively holding said mounting member adjustment portion in a position relative to said vertical member.

11. The trailer hitch apparatus of claim 1, wherein said mounting member trailer mounting portion has an hitch hole for insertion of a hitch ball therethough for mounting a hitch ball to said mounting member trailer mounting portion.

12. The trailer hitch apparatus of claim 1, further comprising a triangular gusset member having a first gusset member side and a second gusset member side, said first gusset member side being coupled to said horizontal member, said second gusset member side being coupled to said vertical member, said gusset member being for providing additional strength to the coupling of said vertical member to said horizontal member.

13. A trailer hitch apparatus for attaching the hitching shaft of a trailer to the hitch of a vehicle, the hitching shaft of the trailer having a socket said trailer hitch apparatus comprising:

an elongate vertical member having opposite first and second ends;

an elongate horizontal member having opposite first and second ends, said horizontal member being coupled to said vertical member, said horizontal member first end being positioned towards said vertical member first end, said horizontal member being substantially perpendicular to said vertical member;

an elongate securing arm member having opposite first and second ends, said securing arm member first end being coupled to said horizontal member second end, said securing arm member being extended downwards from said horizontal member and being extended away from said vertical member, said securing arm member second end having a mounting flange;

a hitching cap member having a hitching cap member socket portion and a hitching cap member mounting portion, said hitching cap member mounting portion having a mounting channel, said horizontal member being disposed within said mounting channel, said hitching cap member mounting portion being coupled to said horizontal member, said hitching cap member mounting portion being positioned towards said horizontal member first end, said hitching cap member socket portion being for mounting to the ball hitch of a vehicle;

a mounting member having a trailer mounting portion and an adjustment portion, said mounting member trailer mounting portion having an hitch hole for insertion of a hitch ball therethough for mounting a hitch ball to said mounting member trailer mounting portion for hitching the socket of the hitching shaft of a trailer thereto, said mounting member adjustment portion being slidably mounted to said vertical member second end, said mounting member adjustment portion being slidable along a line parallel to the length of said vertical member;

hold means for selectively holding said mounting member adjustment portion in a position relative to said vertical member;

a U-shaped securing bolt member having first and second securing bolt member arms, said first and second securing bolt member arms being detachably coupled to said mounting flange of said securing arm member second end, said first and second securing bolt member arms being spaced apart from one another to define a space between said mounting flange of said securing arm member second end and said securing bolt member, said space being for extending the hitching shaft of a trailer therethrough, said securing bolt member being for attaching the hitching shaft of a trailer to said securing arm member; and a triangular gusset member having a first gusset member side and a second gusset member side, said first gusset member side being coupled to said horizontal member, said second gusset member side being coupled to said vertical member, said gusset member being for providing additional strength to the coupling of said vertical member to said horizontal member.

\* \* \* \* \*